April 2, 1935.  W. B. FAGEOL ET AL  1,996,540
DUMPING VEHICLE
Filed April 15, 1932   2 Sheets—Sheet 1
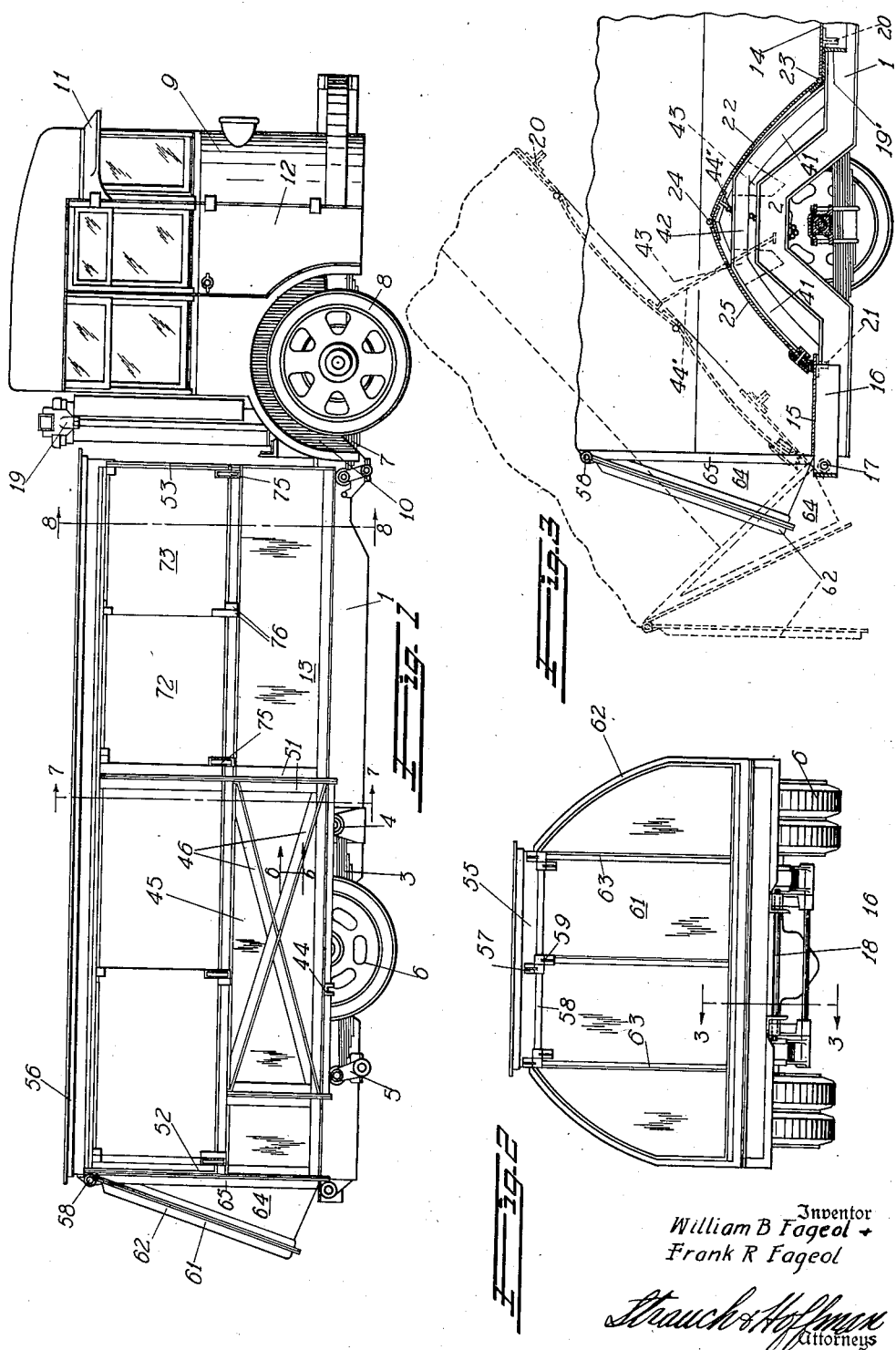
Inventor
William B Fageol +
Frank R Fageol
Strauch & Hoffman
Attorneys April 2, 1935.  W. B. FAGEOL ET AL  1,996,540
DUMPING VEHICLE
Filed April 15, 1932   2 Sheets-Sheet 2
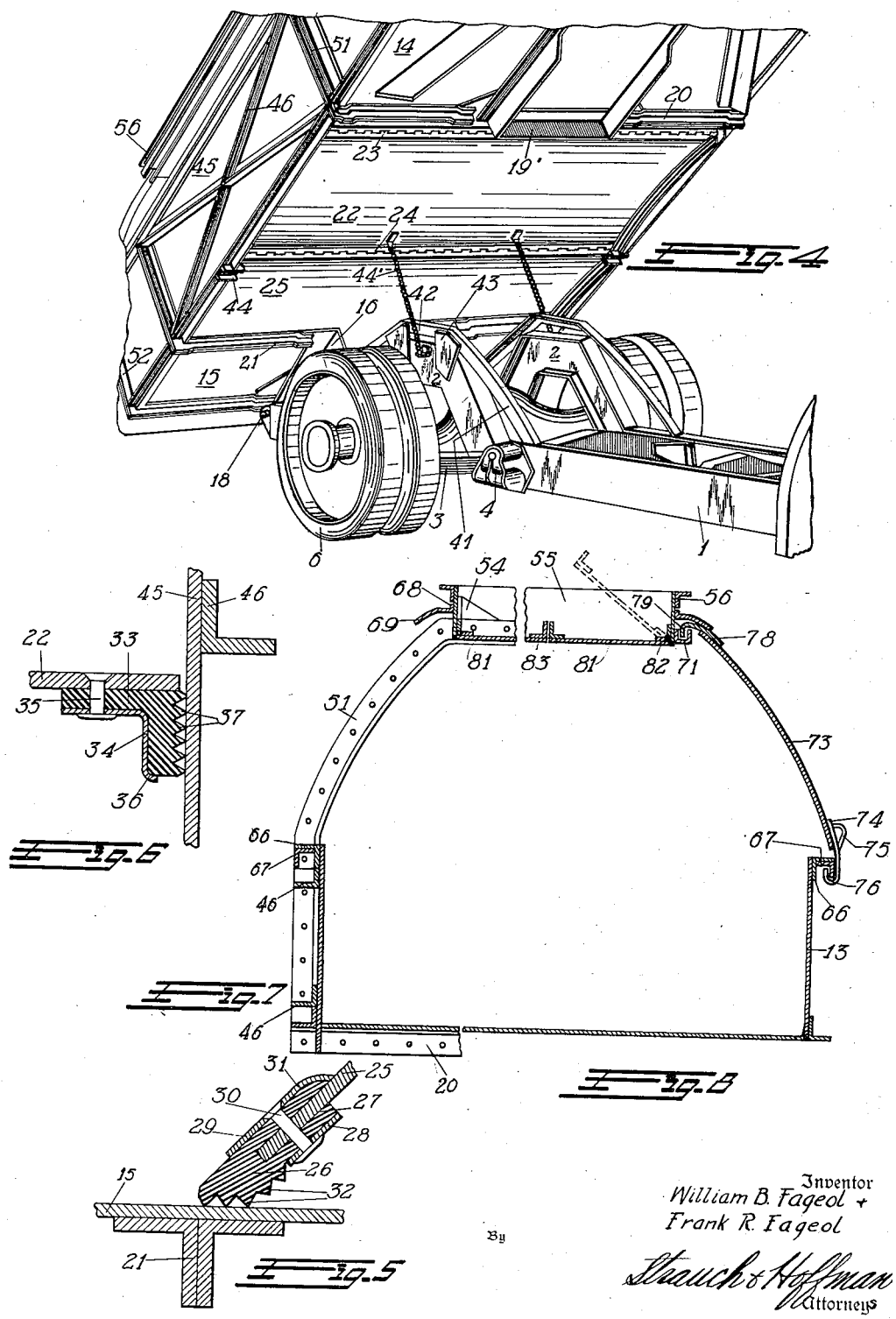
Inventor
William B. Fageol +
Frank R. Fageol
By
Strauch & Hoffman
Attorneys Patented Apr. 2, 1935

1,996,540

UNITED STATES PATENT OFFICE 1,996,540

DUMPING VEHICLE

William B. Fageol and Frank R. Fageol, Kent, Ohio, assignors to Twin Coach Company, Kent, Ohio, a corporation of Delaware Application April 15, 1932, Serial No. 605,514

22 Claims. (Cl. 298—17)

The present invention relates to vehicles and more particularly to those of the type having a body which may be tilted to allow the material contained therein to be gravitationally discharged therefrom during unloading operations.

More particularly our invention relates to that type of vehicle that is used in municipalities for the collection and disposal of refuse such as garbage, ashes and the like.

The vehicles in use today for this purpose are of such a nature that the body thereof is relatively high from the ground, thus rendering loading thereof difficult and requiring the workers to lift the garbage and ash receptacles to a relatively great height in order to dump the material into the truck body. This is very tiring on the workers and due to the extra loading time required, the efficiency of the refuse collecting units is materially lowered. Moreover, the present vehicles, due to their difficult loading character, have a tendency to cause the workers to be careless in their handling of the refuse receptacles with the result that material is often spilt and finds its way to the sides of the vehicle and to the street. These vehicles likewise have a very high center of gravity.

Vehicles of this character are usually provided with hinged doors which are substantially horizontal when in closed position, and are so difficult to manipulate that the workers usually leave them open, with the result that when garbage is being handled, objectionable odors find their way to the atmosphere, and when ashes are being handled the wind picks up loose particles and distributes them over the immediate neighborhood, both of which are obviously undesirable features.

Vehicles of the character that are used for hauling garbage are not fluid-tight, with the result that when considerable garbage has been loaded therein, the liquid material separates therefrom, and leaks out of the vehicle.

The present type of vehicle used for this work usually is provided with a small cab that does not furnish comfortable transportation for the entire crew of workers.

Moreover, vehicles heretofore proposed for this purpose have been of such long wheel base that they are difficult to maneuver in the necessarily small areas in which they operate.

Accordingly, a primary object of the present invention is to provide a vehicle of the character mentioned that has a very low body thus providing easy loading thereof, and which may be tilted to gravitationally discharge the contents thereof, and which vehicle accordingly has an extremely low center of gravity.

Another object of the present invention is to provide a vehicle of the character stated that is provided with doors of such a character that their operation is very easily effected, and workers will not be tempted to leave them open during the time that the vehicle is not actually being loaded.

Another object of this invention is to provide a vehicle of the character mentioned having a body that is absolutely fluid-tight and will accordingly not permit the escape of extraneous fluid therefrom.

A further object of the present invention is to provide a vehicle for the purpose described which is of such a character that it provides ample facilities for comfortably transporting the entire crew of workmen that are needed for the loading operation and will afford them ample protection against the weather at all times.

Another object of the present invention is to provide a vehicle of the character mentioned that has a very short wheel base, enabling it to be manipulated in very small and restricted areas.

Other objects of the invention will become apparent as the description thereof proceeds in connection with the drawings, in which:

Figure 1 is a side elevation of our improved vehicle.

Figure 2 is a rear view in elevation of the vehicle shown in Figure 1.

Figure 3 is a longitudinal sectional view of the rear portion of the vehicle shown in Figure 1, and also contains a dotted line illustration of the dump body in raised position.

Figure 4 is a perspective view of the vehicle illustrated in Figure 1, with the body thereof disposed in dumping position.

Figure 5 is an enlarged detailed view in section of the cooperating portions of the stationary and auxiliary sections of the body floor, showing the means that are employed for insuring a sealing connection therebetween.

Figure 6 is a detailed view in section taken on line 6—6 of Figure 1, of one of the collapsible floor sections and a side wall of the body, showing the sealing means employed therebetween.

Figure 7 is a section taken substantially on line 7—7 of Figure 1 and looking in the direction of the arrows; and Figure 8 is a sectional view taken on line 8—8 of Figure 1, as viewed when looking in the direction of the arrows.

Referring to the drawings, wherein like figures designate like parts throughout the several views thereof, a vehicle is provided with longitudinal frame members 1, having kicked up portions 2 at their ends to provide a recess for vertical rear axle movements. Rear springs 3 are shackled to frame members 1 at 4 and 5 respectively, and the springs carry the rear axle assembly and rear wheels 6 in well known manner.

The front ends of the frame members 1 are kicked up in a similar manner to provide for vertical movements of the front axle and the front springs 7 are shackled thereto in well known manner and are provided with a conventional front wheel assembly 8. As shown in the drawings, frame members 1 extend considerably beyond the front wheels, and these extended portions carry an internal combustion engine of any desired type suitably coupled to the rear axle assembly in well known manner. A closed cab 9 is mounted upon the extended portions of the frame members 1 and extends the full width of the vehicle, and accordingly is of ample size to provide transportation for several workers. Cab 9 is provided with a visor 11 and a door 12 and resembles the front end of a well known high grade passenger vehicle. The cab extends over the sides of the front wheels and is provided with wells therefor and fenders 10.

The vehicle body is provided with sides 13, a front floor portion 14, and a rear floor portion 15, which is spaced from the front floor portion a distance sufficient to accommodate the rear wheels 6. A pair of angle members 16 are secured to the under side of the rear floor 15 in any suitable manner as by welding, riveting or the like, and are provided at their rear ends with apertures 17. Body pivoting bar 18 extends through the aperture 17 and through aligned apertures in the rearmost extremity of the frame members 1. It is therefore seen that the body is securely pivoted to the frame members for swinging movement in a vertical plane. It will be understood, that while we have shown the body as pivoted to the vehicle, it may be connected thereto by links or the like for effecting tilting thereof.

The body is caused to swing into tilted discharging position by means of any well known lifting mechanism which is designated generically as 19, the lifting element thereof being suitably connected to the body near the floor thereof. The front end of the body is prevented from undergoing lateral shifting movements by means of an angle member 19', which is secured to the under surface of the body and provides spaced flanges which are adapted to seat against and be disposed between frame members 1, when the body is disposed in loading or horizontal position.

The vehicle body is provided with collapsible floor sections which form a well or housing for the rear wheels and the kicked up portion 2 of the frame, when the body is in loading or horizontal position, and the sections automatically collapse into a position disposed substantially in the plane of the vehicle floor when the body is raised, thus providing an uninterrupted surface for the gravitational discharge of the material during the dumping operation. This collapsible floor structure will now be described. Front floor portion 14 is provided at suitable intervals with lateral bracing members 20, which terminate near the center of the vehicle so that floor 14 can rest throughout its length directly upon the frame member 1. Rear floor 15 is likewise provided with a lateral brace member 21 which is cut away in a similar manner as brace 20. An auxiliary floor member 22, which is preferably of slightly curved configuration is secured to the rear edge of floor 14 by means of a hinge 23 which extends the full width thereof for the purpose of giving it substantial support. Secured to the other edge of auxiliary floor section 22, by means of a similar hinge 24, is a second auxiliary floor section 25. These auxiliary floor sections cooperate with the vehicle body in a manner presently to be described. Referring more particularly to Figure 5, auxiliary floor section 25 is provided with a rubber gasket member 26 which is adapted to slide up on the rear floor section 15 and provide a sealing engagement therewith. Gasket member 26 is provided with a slot 27 into which the free edge of floor section 25 is inserted. Gasket 26 is securely clamped to floor section 25 by means of clamping plates 28 and 29 which are clamped together by means of a series of rivets 30 or the like which extend throughout the length thereof. As shown in the drawings, plate 29 is provided with a rounded front end 31, which contacts section 25 and causes exclusion of extraneous matter. The contacting face of the gasket is provided with a series of longitudinal ribs 32, the outer periphery of which define an arc so that several of the ribs will always be in contact with floor 15 and the hydraulic efficiency thereof will thus be equally good regardless of the position that the floor section takes. When the truck is under load the corrugated teeth 32 will, due to their small sections, be deformed against the face of floor section 15, and such deformation assures an intimate contact of the gasket therewith thus leakage of fluid is prohibited.

Auxiliary floor sections 22 and 25 terminate fairly close to the side walls 13 of the vehicle body and are provided with gaskets for preventing fluid leakage between the same. Referring more particularly to Figure 6 of the drawings, floor section 22 is illustrated having a gasket 33 associated therewith. Gasket 33 is angular in cross-section and is provided with an angular backing plate 34 that firmly clamps the gasket to the floor section 22, and is secured thereto by means of rivets 35 or the like. Backing plate 34 is provided with an additional flange 36 which prevents lateral flow of the rubber gasket when it is put under the pressure against the side of the body to render it effective as a sealing member. Gasket 33 is provided with longitudinal ribs 37 which establish an intimate contact between the gasket and the sides of the vehicle body in much the same manner as the ribs described in connection with gasket 26. It is therefore seen that auxiliary floor sections 22 and 25 are slidably and sealingly associated with the vehicle body.

In Figure 3 the body is shown in its loading position. The auxiliary floor sections 22 and 25 are supported, when the body is in this position, by means of a pair of angle members, 41, which are connected by short straight portions 42. Each extremity of these members is secured to the frame member 1 in any suitable manner as by riveting, welding or the like, and the mid-portions are connected to the kicked-up portion 2 of the frame by means of plates 43 which are riveted thereto. These spaced supports give the auxiliary floor sections 22 and 25 ample support and prevent them from undergoing any twisting or distorting tendencies while under load.

It will readily be understood that while we have disclosed the auxiliary floor as consisting of two hinged sections, and prefer this structure, more than two sections may be successfully employed. Moreover, the auxiliary floor sections may be hinged to the rear floor 15, instead of the front floor 14, with good results, but we prefer to hinge them to the front floor because the material contained in the body under these conditions does not tend to gravitate under the free edge of the auxiliary floor section during dumping thereof, as would probably occur if the auxiliary section were hinged to floor 15.

It will also be understood that a single auxiliary floor section could be employed instead of the two sections that we have disclosed, such section having a curved surface cooperating in sealing relation with the edge of the floor opposite that to which it is hinged, and possessing a curvature equal to an arc swung about its pivot as an axis.

In operation, the vehicle body is brought into horizontal loading position and filled, on either side of the auxiliary floor sections, with the particular material being handled. When it is desired to discharge the contents of the vehicle, the body is tilted into the position shown in Figure 4. During the tilting operation the auxiliary floor sections descend with their respective gaskets in sliding engagement with the body walls and floor section 15, thus preventing leakage of any fluid material.

When the body has reached its fully tilted position the auxiliary floor sections assume the substantially horizontal positions shown, and provide a clear and uninterrupted surface for the gravitational discharge of material therefrom. The auxiliary floor sections are supported when in this position by means of inwardly extending lugs 44 which are secured to the sides 13 of the vehicle body, and support the auxiliary sections near the region of their hinge 24, as clearly shown in Figure 4. When the body is returned to its horizontal loading position, the auxiliary floor sections will contact supports 41, and be automatically raised to their well forming positions.

In the present vehicle we have disclosed means for positively bringing the auxiliary floor sections to horizontal position when the body is tilted into discharging position, regardless of whether the body is loaded with trash or snow or any other relatively light material. Secured to each frame member, by means of a bracket or the like, is a chain or other suitable flexible element 44′, which is secured at its other end to floor section 22, near the hinge thereof. It is therefore seen, that as the body is tilted into discharging position, the auxiliary floor sections will be drawn downwardly by chains 44′ into horizontal position.

Panels 45 are disposed in the region of the collapsible floor sections 22 and 25 and cooperate with the gasket 33 thereof to maintain a liquid tight joint. They are accordingly reenforced with angle members 46 or the like, so that they will not distort or bulge outwardly under the influence of gasket pressure, and a fluid tight joint will thus be maintained at all times.

The body structure will now be described. Secured to the sides of the body at its mid-portion are a pair of angle members 51 which have their free flanges secured together in facing relationship and curve inwardly above the top edge of the vehicle sides and extend across the top of the body to support the roof structure. Member 51 accordingly assumes the configuration of an inverted U-member, and the lower extremities thereof are preferably secured to the outer ends of reenforcing members 20 located under the body which have been previously described. A similar U-member 52 is secured to the vehicle sides at their rear ends, and supports the rear end of the roof structure. A single angle member 53 of similar U-shaped configuration is secured to the sides of the vehicle body at the front end thereof and has the flange thereof turned inwardly to which the front wall of the vehicle body is secured as by rivets or the like.

Secured to the straight mid-portions of members 51, 52 and 53, by means of flanged plates 54 or the like is a rectangular frame member 55 which is reenforced or stiffened at its upper edge by means of an angle member 56 which is secured thereto in any suitable manner as by rivets or the like.

Secured to the rear face of frame member 55 are a series of brackets 57 in which a pivot rod 58 is journaled. Journaled on rod 58 is a plurality of brackets 59 which are secured to an end gate 61. End gate 61 is reenforced around its periphery with an angle member 62 secured thereto, and is also reenforced vertically by spaced angle members 63 which are secured to the rear face thereof. Secured to the rearwardly extending flange of U-member 52 is a member 64, the periphery of which is reenforced at angle member 65, the flange thereof forming an abutting face against which the end gate is adapted to seat when in closed position. The end gate may be held in closed position by any suitable form of latch, (not shown). In this connection it will be noted that the lower peripheral edge of the member 64 is considerably elevated from the floor level, and since the liquid content of the material handled usually will seek a level that is lower than this edge, no leakage of fluid from the vehicle will occur.

We preferably provide the vehicle with sliding doors so that when loading operations are not actually taking place the vehicle body may be closed up to prevent offensive odors from escaping therefrom, in the course of garbage collection, and when ashes are being handled, for preventing distribution thereof by air currents. Moreover, when the vehicle is loaded above its normal capacity, the doors may be closed to prevent the material from flowing over the sides of the vehicle body. To this end we provide guides on each side of the rectangular frame member 55 and also on the upper edge of the body sides 13 for guiding the movements of sliding doors. Referring to the lower guiding means, an angle member 66 is secured to the body sides 13 and flush with the upper edges thereof. To the horizontal leg of angle member 66 is secured a second angle member 67 to provide a depending flange. These two members are welded together for the purpose of producing a smooth uninterrupted loading edge for the vehicle body. The upper guiding means comprises an angle member 68 which is secured to frame member 55 and provides a downwardly depending flange 69, and cooperates with an angle member 71 secured to member 55 and providing an upwardly extending flange. Doors 72 and 73 are provided at their lower ends with lugs 74 which are riveted thereto and have handles 75 struck therefrom. The lower extremities of lug members 74 are inwardly and reversely bent to form hook portions 76 which are adapted to seat and have guided movement in the space defined by angle members 66 and 67. The upper edges of the doors are provided with lugs 78 which are provided with right angular extremities 79 which are adapted to ride on the upper edge of flange 71 and are prevented from lateral withdrawal movements by downwardly depending flange 69. As seen in the drawings the doors 73 slide over doors 72, and the lugs on doors 72 are accordingly offset to permit this overlapping sliding movement of the doors.

The bottom of the rectangular frame 55 is preferably closed by suitable doors for permitting the vehicle body, when trash or snow is being handled, to be loaded to its normal capacity through the side doors thereof, and then to be further loaded through the top thereof when the side doors have been closed. To this end we have provided four doors 81 which are suitably hinged to the inner walls of frame member 55 as at 82. One pair of doors is disposed between members 51 and 52, and the other pair is disposed between members 51 and 53, and rest upon the inwardly directed flanges thereof when in closed position. The doors are stiffened adjacent their meeting edges by angle members 83. When the vehicle is employed for garbage or ash disposal, doors 81 will naturally be closed, and when so disposed, they cooperate with frame 55 to form a shallow compartment that may be used for the storage of workmen's tools or the like.

It is therefore seen that we have provided a vehicle of the tilting body type that is constructed to permit the body to be disposed at a much lower elevation than heretofore has been possible in vehicles of this character, permitting easy loading thereof, and yet does not impair the efficiency thereof when dumping operations are being effected. The center of gravity of the vehicle is accordingly very low, and the vehicle is given good operating characteristics.

While we have illustrated a vehicle especially adapted for collecting and hauling refuse, it will readily be understood that the door and frame structure could be omitted from the body, and the vehicle used for handling any other desired fluent or semi-fluent material such as sand, gravel, crushed stone, bricks or the like with equally good results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle comprising a chassis; a body mounted on said chassis for movement from a substantially horizontal loading position to an inclined discharging position; the floor of said body being disposed in a plane lying below the top of the rear wheels of said vehicle when said body is in loading position; means associated with and forming a portion of said floor and lying substantially in the plane thereof when said body is in discharging position for effecting gravitational discharge of material therefrom; means for causing said first named means to move out of the plane of said floor and form a housing for said vehicle wheels when said body moves from discharging to loading position, and means associated with said first named means and frictionally cooperating with parts of said body for preventing improper flow of material, when said body is disposed in either loading or discharging position.

2. A vehicle comprising a chassis; a body mounted on said chassis for movement from a substantially horizontal loading position to an inclined discharging position; said body being provided with a pair of spaced floors, said floors being disposed in substantially the same plane and lying below the top of the vehicle wheels when said body is in loading position; and means associated with said floors and bridging the space therebetween and forming a housing for said vehicle wheels when said body is in loading position; and means for enabling said first named means to move substantially into the plane of said floor when said body moves from loading to discharging position; whereby gravitational discharge of material therefrom is readily effected.

3. The vehicle set forth in claim 2 wherein said first named means comprises a plurality of auxiliary floor sections.

4. The vehicle set forth in claim 2 wherein said first named means comprises a plurality of auxiliary floor sections pivotally connected to each other and to one of said floors.

5. A vehicle comprising a chassis; a body mounted on said chassis for movement from a substantially horizontal loading position to an inclined discharging position; said body being provided with a pair of spaced floors and a pair of sides; said floors being disposed in substantially the same plane and lying below the top of the rear vehicle wheels when said body is in loading position; flexibly connected auxiliary floor members having a flexible connection with one of said floors and adapted to form a housing for said vehicle wheels when said body is in horizontal position, said auxiliary floor members being operable to move substantially into the plane of said floors when said body moves from loading to discharging position, and sealing means associated with said auxiliary floor members and cooperating with the sides of said body.

6. The vehicle set forth in claim 5 wherein said vehicle sides are provided with means for preventing distortion thereof against the action of said sealing means.

7. In a vehicle, a chassis; a body associated with said chassis and mounted for movement from a substantially horizontal loading position to an inclined discharging position, said body having the floor thereof disposed in a plane lying below the top of the vehicle wheels when the body is disposed in loading position; and means carried by said body forming a housing extending from side to side of said body and enclosing said wheels when said body is disposed in loading position, said means being automatically movable toward said floor and cooperating with the latter to form a substantially smooth surface to effect unrestricted discharge of material from said body when the latter is inclined into discharging position.

8. In a vehicle, a chassis, a body associated with said chassis and mounted for movement from a substantially horizontal loading position into an inclined discharging position, auxiliary floor-forming means associated with the floor of said body, said floor forming means comprising a plurality of floor members pivotally connected to each other and to said floor; means for causing said floor-forming means to become a comparatively rigid wheel housing when said body is moved into loading position; said floor-forming means being operable to form a comparatively rigid, and substantially flat floor when said body is moved into discharging position.

9. In a vehicle, a chassis; a body associated with said chassis and mounted for movement from a substantially horizontal loading position to an inclined discharging position, said body having a pair of horizontally spaced floors, a plurality of auxiliary floor forming members flexibly connected to each other; one of said floor forming members being flexibly connected to one of said floors, and another of said floor-forming members being adapted to slide upon said other floor when said body is undergoing movement into and out of loading and discharging positions; and means for preventing the leakage of fluid between said last-named floor-forming member and said last-named floor.

10. The device described in claim 9, wherein said means comprises a sealing device associated with said last-named floor-forming member and cooperating with said last-named floor.

11. In a vehicle body having sides and a floor, a plurality of auxiliary floor members pivoted to each other and flexibly connected to said floor, said floor members being adapted to move in slidable engagement with the sides of said body, and means for preventing fluid, that may be contained in said body, from leaking between said floor members and the sides of said body.

12. The device described in claim 11, wherein said means comprises sealing members associated with said floor members and disposed in frictional engagement with said sides.

13. The device set forth in claim 11, wherein said means comprises sealing members associated with said floor-forming members and disposed in frictional engagement with said sides; and said sides are reenforced against flexing in response to the pressure of said sealing members.

14. A vehicle comprising a chassis; a body mounted on said chassis for movement from a substantially horizontal loading position to an inclined discharging position; said body having a floor portion disposed in a plane lying below the top of the vehicle wheels when said body is in loading position; and auxiliary floor forming means associated with said floor and normally forming a housing for said wheels when said body is in loading position; said floor forming means being adapted to rock in a plane parallel to the longitudinal axis of said floor to move substantially into the plane of said floor when said body moves from loading to discharging position.

15. A vehicle comprising a chassis; a body mounted on said chassis for movement from a substantially horizontal loading position to an inclined discharging position; said body being provided with a pair of spaced floors; said floors being disposed in substantially the same plane and lying below the top of the vehicle wheels when the body is in loading position; and means associated with said floors and bridging the space therebetween and normally forming a housing for said vehicle wheels when said body is disposed in a loading position; said means being adapted to rock in a plane parallel to the longitudinal axis of said floor to move substantially into the plane of said floor when said body moves from loading to discharging position.

16. In a vehicle having a chassis, a body mounted on said chassis for tilting movement from a substantially horizontal loading position into an inclined discharging position, said body having front and rear longitudinally spaced floors which are adapted to lie below the top of the vehicle wheels when the body is disposed in loading position; auxiliary floor-forming means operably associated with said floors and bridging the space therebetween and disposed substantially in the plane of said floors when said body is disposed in discharging position; and supporting means, carried by said chassis, and disposed in alignment with, and operable to enter the space between said floors and cause said auxiliary floor-forming means to move out of the plane of said floors and form a housing for said vehicle wheels when said body is tilted from discharging to loading position.

17. The vehicle described in claim 16, wherein said body is tiltable about an axis adjacent its rear end, and said auxiliary floor-forming means is flexibly connected to said front floor.

18. The vehicle described in claim 16, wherein said supporting means provides at least one longitudinally curved surface, which is adapted to lie in surface engagement with said auxiliary floor-forming means when said body is disposed in loading position.

19. The vehicle described in claim 16, wherein said auxiliary floor forming means comprises a plurality of flexibly interconnected floor elements, and said supporting means is operable to lie substantially in surface engagement with said floor elements when said body is disposed in loading position.

20. The vehicle described in claim 16, wherein said chassis comprises a pair of longitudinally extending frame members which are kicked up in the region of the rear wheels of the vehicle, and said supporting means comprises a member secured to the kicked up portion of each frame member.

21. The vehicle described in claim 16, wherein means are provided on said body for supporting said auxiliary floor forming means when said body is disposed in discharging position.

22. The vehicle described in claim 16, wherein the space between said floors extends from side to side of said body.

WILLIAM B. FAGEOL.
F. R. FAGEOL.